US006791454B2

(12) United States Patent
Mangold et al.

(10) Patent No.: US 6,791,454 B2
(45) Date of Patent: Sep. 14, 2004

(54) CABLE

(75) Inventors: Klaus Mangold, Erlangen (DE); Kurt Sellner, Langenzenn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/928,940

(22) Filed: Aug. 13, 2001

(65) Prior Publication Data

US 2002/0061727 A1 May 23, 2002

(30) Foreign Application Priority Data

Nov. 17, 2000 (DE) ........................................ 100 57 070

(51) Int. Cl.[7] ............................................... H04M 11/04

(52) U.S. Cl. ............................ 340/310.01; 340/310.06; 340/310.07; 340/310.03; 375/259; 455/33; 174/33; 174/116; 174/113 R

(58) Field of Search ....................... 340/310.01, 310.06, 340/310.07, 310.03; 375/259; 455/33; 174/113 R, 116, 33

(56) References Cited

U.S. PATENT DOCUMENTS

| | | | | | |
|---|---|---|---|---|---|
| 4,420,752 | A | * | 12/1983 | Davis et al. | 340/870.17 |
| 5,043,949 | A | * | 8/1991 | Shechter | 367/76 |
| 5,777,545 | A | * | 7/1998 | Patel et al. | 340/310.06 |
| 5,818,127 | A | * | 10/1998 | Abraham | 307/106 |
| 5,859,584 | A | * | 1/1999 | Counsell et al. | 340/538 |
| 5,892,430 | A | * | 4/1999 | Wiesman et al. | 340/310.01 |
| 5,952,914 | A | * | 9/1999 | Wynn | 340/310.01 |
| 6,151,480 | A | * | 11/2000 | Fischer et al. | 340/310.01 |

FOREIGN PATENT DOCUMENTS

| | | |
|---|---|---|
| DE | 19527972 | 1/1997 |
| DE | 19702536 | 7/1998 |
| DE | 19814540 | 10/1999 |
| DE | 19831090 | 1/2000 |
| FR | 2743186 | 7/1997 |

* cited by examiner

*Primary Examiner*—Daniel J. Wu
*Assistant Examiner*—Tai T. Nguyen
(74) *Attorney, Agent, or Firm*—Baker Botts L.L.P.

(57) ABSTRACT

The present invention relates to a cable (K1, K2) which has integrated identification transmitters (KG1–KG5) for cable-specific data. This data can be checked by using wires or without wires. In this way, for example, extensive details relating to the cable (K1, K2) and the wiring of the cable (K1, K2) can be provided by electrical means to a fitter at any time.

3 Claims, 1 Drawing Sheet

CABLE

FIELD OF THE INVENTION

Figure 1:
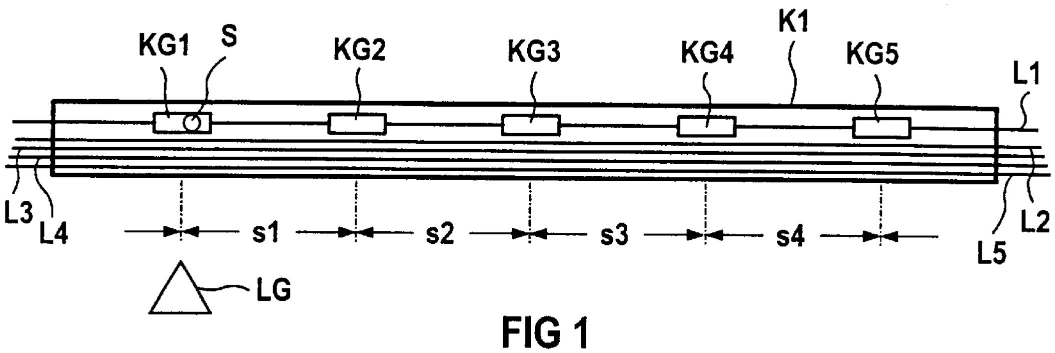

The present invention relates to a cable for direct or indirect transmission of electrical signals and/or electrical power, with information transmitters being connected to the cable with a force fit, a positive lock and/or by techniques such as bonding, soldering or welding along the cable.

BACKGROUND OF THE INVENTION

Today, electrical cables for industrial purposes are technically complex, and accordingly expensive. In order to monitor such cables, for example, for water leaks, sensors for transmitting information are embedded in the cable and are used to detect faulty operating states. Although the basic operation of the cable is important, even greater importance is generally attached to the danger to the overall process in the event of cable faults in technical systems. A cable of the type mentioned initially and having an integrated sensor system is known from DE 195 27 972 A1.

During cable installation, the fitter has until now been provided with markings on the cable, irrespective of whether these are color markings or bar codes, as to the cable type, and which line is which in the respective cable. On the basis of this knowledge and by using the appropriate circuit diagram or wiring diagram, the fitter can then wire up the individual cores in the respective cable. He thus requires not only cable-specific information but also system-specific information, for example in the form of manuals and circuit diagrams.

SUMMARY OF THE INVENTION

The object of the present invention is to design a cable of the type mentioned initially such that, even without any extensive written documentation, the fitter is able to obtain all the missing information directly from the cable, by using an evaluation unit. This object is achieved by providing identification transmitters for channel-specific data as information transmitters. The information is transmitted either without wires, inductively or capacitively or by means of electromagnetic waves, or by use of wires from the identification transmitters to at least one evaluation unit. The application as originally filed in German is incorporated herein by reference.

In a preferred embodiment of the present invention, the identification transmitters are supplied with electrical power in series via a line system. In this way, the identification transmitters can be supplied centrally with electrical power at a defined voltage or with a defined current. This is of major importance for safe and reliable operation particularly when the identification transmitters contain technical facilities of relatively major complexity, such as microprocessors. Since the identification transmitters are connected to the cable in a predetermined grid pattern, the grid pattern can be used to deduce the respective cable location. The grid pattern can then either be used incrementally, by which means only length changes can be detected, or it is also possible to obtain information about absolute locations on the cable by means of position coding. Since the identification transmitters are all arranged in the spaces formed between the conductors in the cable, the installation of the identification transmitters does not interfere with the external shape of the cable.

In a further preferred embodiment of the present invention, sensors for detecting cable-internal or cable-external physical measurement variables are also provided, and are included in the information transmission. The option of using sensors for detecting operating states of the cable or environmental variables related to the cable has already been mentioned in the introduction. It is advantageous that this functionality be included without any problems in the information transmission for providing identification. Since the identification transmitters are in the form of integrated electrical modules, possibly with sensors being included, these modules can be produced with extremely small dimensions.

In order to ensure that the invention can also be used with shielded cables, a further preferred embodiment of the present invention provides for the identification transmitters to be located outside the shield. This may either be done by the identification transmitters being integrated in the plastic sheet of the cable. If the identification transmitters are provided within a shielded area, free spaces must be provided, for example in the form of cutouts or upward bends in the shield.

DRAWINGS

Figure 2:
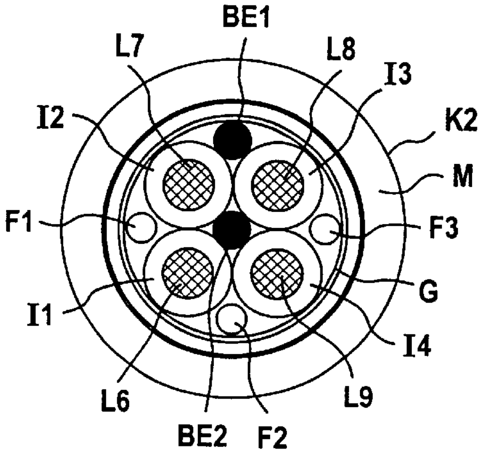

A preferred embodiment of the present invention is described in more detail in the following text and is illustrated in the drawings, in which:

FIG. 1 shows a longitudinal section through a cable according to the present invention; and FIG. 2 shows a cross section through such a cable.

DETAILED DESCRIPTION OF THE INVENTION

FIG. 1 shows a basic illustration of a cable K1, which can accommodate conductors L1 to L5 embedded in its insulation. In this case, the conductors L2 to L5 are intended for carrying power or for signaling purposes, while the conductor L1 contains a serial link from a large number of identification transmitters, for example identification transmitters KG1 to KG5 in the illustrated section of the cable K1. The conductor L1 can in this case supply power to all the series-connected identification transmitters KG1 to KG5, provided electrical power is fed in both directions. In principle, of course, it is also possible for the identification transmitters KG1 to KG5 to be supplied with power by two lines, such that the identification transmitters KG1 to KG5 are in this case connected in parallel rather than in series.

Apart from feeding in power via a line system, such as the conductor L1, it is also possible either to transmit information to the identification transmitters KG1 to KG5, or to check information from the identification transmitters KG1 to KG5. This can be done by clock control or by request control. It is likewise possible for all or individual identification transmitters to have associated sensors. This is shown by a sensor as shown in FIG. 1, which is indicated by a circle, for the identification transmitter KG1. The sensors may be used to detect the temperature of the respective cable, to detect water leakage in the cable, or to detect bending cycles of the cable, etc.

The information transmitted to the identification transmitters KG1 to KG5 is chosen such that it first indicates the type of cable K1, and second indicates information relating to the nature of the conductors in the cable K1, for example the conductors L1 to L5. Furthermore, the large possible information content which can be stored in the identification transmitters, for example the identification transmitters KG1 to KG5, also allows complete cable wiring diagrams for widely differing applications of the cable K1 to be stored. This stored information, possibly including additional information detected by the sensor system (sensor S) can be read by using readers, an example of which is reader LG symbolized by an open triangle. The fitter may be provided with this in the form of a transportable unit. However, in principle, it is also possible for the information from the identification transmitters KG1 to KG5 (and from the sensor S) to be checked by connecting an evaluation unit to the conductor L1. In principle, both the feeding and the checking of information are thus possible either via direct access to the line system, for example the conductor L1, or by wire-free evaluation, for example using the reader LG. A plotter or printer can also be integrated in the reader LG.

FIG. 1 also shows that uniform intervals (s1 to s4) are provided between the identification transmitters KG1 to KG5. Such a cable K1 can be manufactured relatively easily and in each case provides the fitter with a wire-free checking capability in the predetermined interval grid pattern. This is helpful whenever the two ends of the cable K1 are not both located within the fitter's handling area.

FIG. 2 likewise shows how identification transmitters can be accommodated in the cable K2, although, for the sake of clarity, the identification transmitters are in this case not illustrated in the form of a large number of items. Cable K2 as shown is a cable which has four conductors L6 to L9 which are covered with respective insulation I1 to I4. The four cores formed in this way are located within a belt G on which a sheath M is seated, which thus governs the external contour of the cable K2.

Free spaces, which are filled by filling cores F1 to F3, are formed between the conductors L6 to L9. The gap between the conductors L7 and L8 leaves a free area BE1 which can be used to allow the identification transmitters described above to be installed along the cable. The area BE1 is indicated in black in FIG. 2. The space in the center of the cable, i.e., in the gap between the conductors L6 to L9, may likewise be used to accommodate identification transmitters. The area BE2 is likewise indicated in black in FIG. 2. The capability to accommodate identification transmitters in the sheath or close to the belt G has already been mentioned in the introduction to the description. However, this is not shown in any more detail in the Figures, for the sake of clarity.

In addition, a number of examples of applications of the invention are as follows:

- inclusion of monitoring and controlling functions;
- inclusion of addressable microprocessors or the like at regular intervals;
- inclusion of sensors or similar functional elements at regular intervals;
- position and core coding for automatic pin and connector coding, and the like;
- cable identification features;
- manufacturer and date of manufacture identification; and
- electrical chips, ICEs, in which a strip, for example a rolled or wound strip, can also be provided as the type of integration, in which case the wound strip itself means that even severe bending influences on the cable do not prevent the use of the identification transmitters.

We claim:

1. A cable for transmission of electrical signals and/or electrical power, comprising jacketing and electronic components within the jacketing along the cable arranged in a predetermined grid pattern, comprising sensors for detecting cable-internal or cable-external physical measurement variables and identification transmitters for transmitting information selected from the group consisting of cable type, nature of conductors in the cable, and cable wiring diagrams for cable applications to at least one evaluating device, and further wherein the identification transmitters are arranged in a free area between conductors within the cable.

2. The cable according to claim 1, wherein said identification transmitters are supplied with electrical power in series via a line system within the cable.

3. The cable according to claim 1, further comprising sensors for detecting cable-interval or cable-external physical measurement variables.

* * * * *